US005305026A

United States Patent [19]

Kazuo et al.

[11] Patent Number: 5,305,026

[45] Date of Patent: Apr. 19, 1994

[54] IMAGE RECORDING APPARATUS HAVING TONER PARTICLE CONTROL MEMBER

[75] Inventors: Sangyoji Kazuo, Nagoya; Tetsuya Kitamura, Gifu, both of Japan

[73] Assignee: Brother Kogyo Kabushiki Kaisha, Nagoya, Japan

[21] Appl. No.: 933,194

[22] Filed: Aug. 21, 1992

[30] Foreign Application Priority Data

Oct. 17, 1990 [JP] Japan .................................. 2-27842

[51] Int. Cl.[5] ........................................ G01D 15/06

[52] U.S. Cl. .................................. 346/159; 355/271

[58] Field of Search ...................... 355/271, 273, 274; 346/159, 1.1, 153.1, 154, 155; 430/53; 250/324

[56] References Cited

U.S. PATENT DOCUMENTS

| | | | |
|---|---|---|---|
| 3,689,935 | 9/1972 | Pressman et al. . | |
| 4,112,437 | 9/1978 | Mir et al. | 346/159 |
| 4,314,257 | 2/1982 | Tokunaga et al. | 346/74.4 |
| 4,322,734 | 3/1982 | Ebi et ak. | 346/153.1 |
| 4,439,781 | 3/1984 | Yang | 346/153.1 |
| 4,478,510 | 10/1984 | Fujii et al. . | |
| 4,491,855 | 1/1985 | Fujii et al. . | |
| 4,635,074 | 1/1987 | Young | 346/74.2 |
| 4,641,958 | 2/1987 | Yuasa | 346/159 |
| 4,865,943 | 9/1989 | Wright | 430/138 |
| 4,891,656 | 1/1990 | Kubelik . | |
| 5,030,976 | 7/1991 | Salmon . | |
| 5,040,004 | 8/1991 | Schmidlin et al. . | |
| 5,099,271 | 3/1992 | Maeda et al. . | |
| 5,157,423 | 10/1992 | Zur | 346/159 |
| 5,258,809 | 11/1993 | Wiedemer | 355/200 |

*Primary Examiner*—A. T. Grimley
*Assistant Examiner*—T. Dang
*Attorney, Agent, or Firm*—Oliff & Berridge

[57] ABSTRACT

The present invention relates to an image recording apparatus which directly controls a flow of charged toner particles by a toner particle control electrode and records an image on an image recording medium. The image recording apparatus has a toner particle supply portion for supplying toner particles charged with a first polarity and a toner particle control electrode for controlling the toner particles supplied by the toner particle supply portion according to an image to be recorded. An intermediate recording medium attracts toner particles controlled by the toner particle control portion and a toner image is formed on the intermediate medium. A transferring station transfers the toner image formed on the intermediate recording medium to an image recording medium. A thermal fixing station fixes the toner image which is transferred to the image recording medium by the transferring station, on the image recording medium. Transfer and fixing of the toner image to the image recording medium may occur by use of a heated pressing roll. Images can be recorded on relatively thick recording media by this apparatus.

21 Claims, 4 Drawing Sheets

IMAGE RECORDING APPARATUS HAVING TONER PARTICLE CONTROL MEMBER

BACKGROUND OF THE INVENTION

1. Field of the Invention

The present invention relates to an image recording apparatus which directly controls a flow of charged toner particles by a toner particle control electrode and records an image on an image recording medium.

2. Description of Related Art

Image recording apparatus which directly control the flow of toner particles when recording an image on an image recording medium are known. One such image recording apparatus is disclosed in U.S. Pat. No. 3,689,935. The construction and the operation of this kind of image recording apparatus are briefly explained as follows.

The image recording apparatus comprises a toner particle supply portion, a toner particle control member, and a back electrode. The toner particle supply portion supplies the charged toner particles below the toner particle control member. The toner particle control member has a plurality of apertures through which the charged toner particles which are supplied from the toner particle supply portion can pass and selectively controls the passage of the toner particles.

The back electrode confronts with the toner particle supply portion through the toner particle control member, and there is a space between the back electrode and the toner particle control member where the image recording medium on which the image will be formed can pass. When the image recording medium passes through the space, the toner particle control member selectively allows the passage of the toner particles through the aperture. The back electrode attracts the toner particles which have passed the aperture of the toner particle control member to the image recording medium on which the image is formed.

The charged toner particles are supplied from the toner particle supply portion to the lower side of the toner particle control member, and a flow of the toner particles is controlled by an electric field in each aperture. The controlled toner particles are attracted in the direction of the back electrode through the aperture, are adhered to the image recording medium which is fed along the back electrode, and the image is formed thereon. A high voltage of about 1 kV (kilovolt) is applied to the back electrode, and the space between the toner particle control member and the back electrode is about 1 millimeter.

However, the image cannot be recorded on a thick image recording medium with this image recording apparatus. That is, the space between the toner particle control member and the back electrode is about 1 millimeter, as mentioned above, so that the image is recorded on the image recording medium when it can pass such a space. But if the image recording medium is thicker than 1 millimeter, it cannot pass through this space and the image cannot be recorded on such an image recording medium.

SUMMARY OF THE INVENTION

An object of the present invention is to provide an image recording apparatus capable of recording a high quality image on a relatively thick rigid image recording medium, for example, a metal plate or cardboard sheet which is thicker than 1 millimeter.

In order to attain the above object, an image recording apparatus for recording an image on an image recording medium according to the present invention comprises: toner particle supply means for supplying toner particles charged with a first polarity; control means for controlling the toner particles supplied by the toner particle supplying means according to an image to be recorded; an intermediate recording medium for attracting the toner particles controlled by the control means and for forming a toner image thereon; transfer means located in a position opposed to the control means for transferring the toner image formed on the intermediate recording medium to an image recording medium; a sheet inlet and outlet arranged to define a linear path for a rigid recording medium; and fixing means for fixing the toner image which is transferred to the image recording medium by the transfer means, on the image recording medium.

According to the image recording apparatus of the present invention thus constructed, the toner particle supply means charges the toner particles to the first polarity and supplies charged particles. Next, the control means controls the toner particles to be recorded according to the image. And, the toner particles controlled by the control means are attracted on the intermediate recording medium and the toner image is formed on the intermediate recording medium. Then, the transfer means transfers the toner image formed on the intermediate recording medium to a desired image recording medium at a position diametrically opposite from the control means. Finally, the fixing means fixes on the image recording medium the toner image which is transferred thereon. Therefore, the position where the toner image is formed on the intermediate recording medium can be separated from the position where the toner image is transferred to the image recording medium, so that it is possible to record an image on an image recording medium which is thicker than 1 millimeter or which is incapable of bending or is difficult to bend.

BRIEF DESCRIPTION OF THE DRAWINGS

A preferred embodiment of the present invention will be described in detail with reference to the following figures wherein.

DETAILED DESCRIPTION OF THE PREFERRED EMBODIMENT

Referring now to the accompanying drawings, one embodiment of the present invention will be explained in detail.

Figure 1:
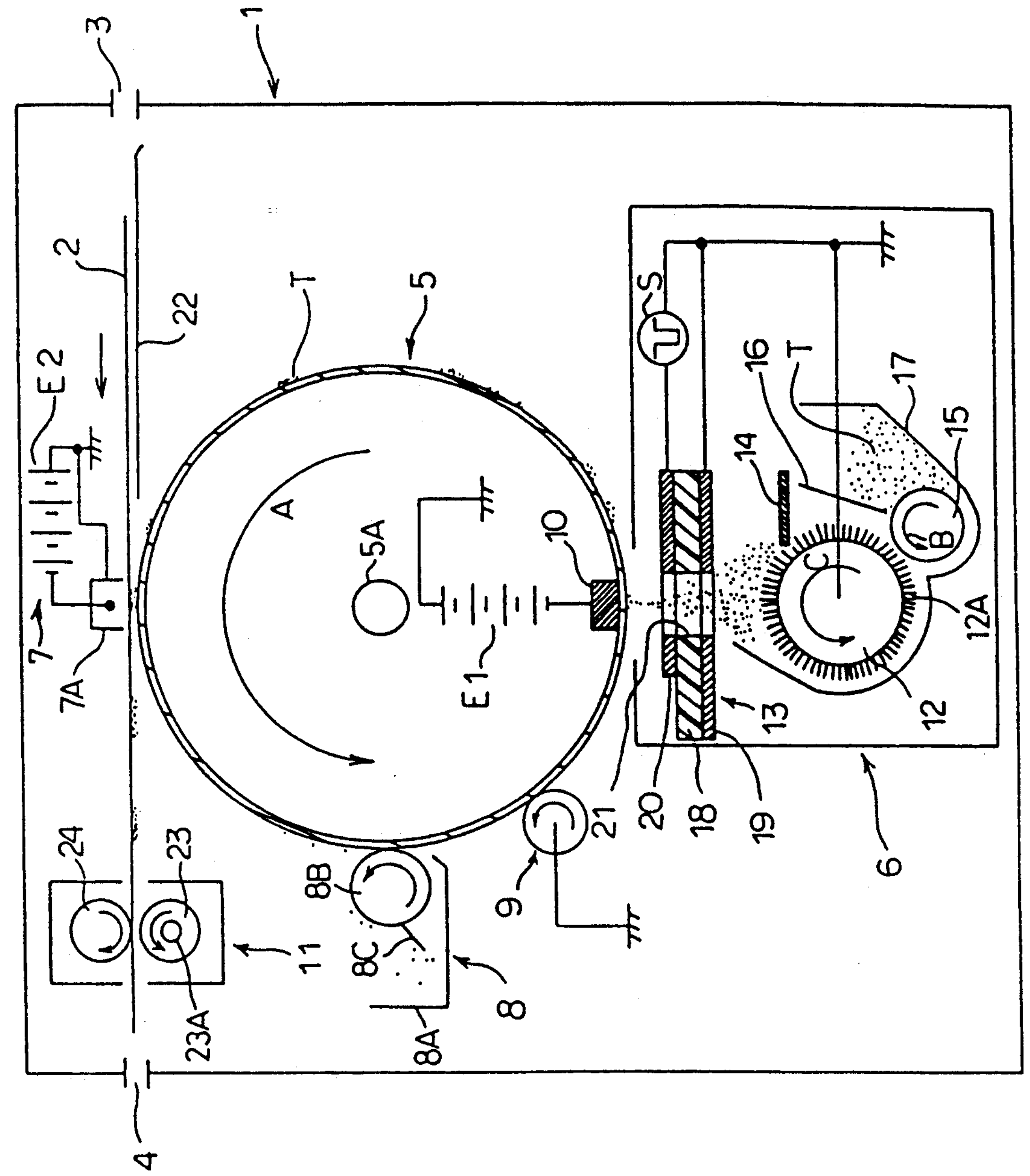
FIG. 1 is a schematic view showing a image recording apparatus of the present invention.
Figure 2:
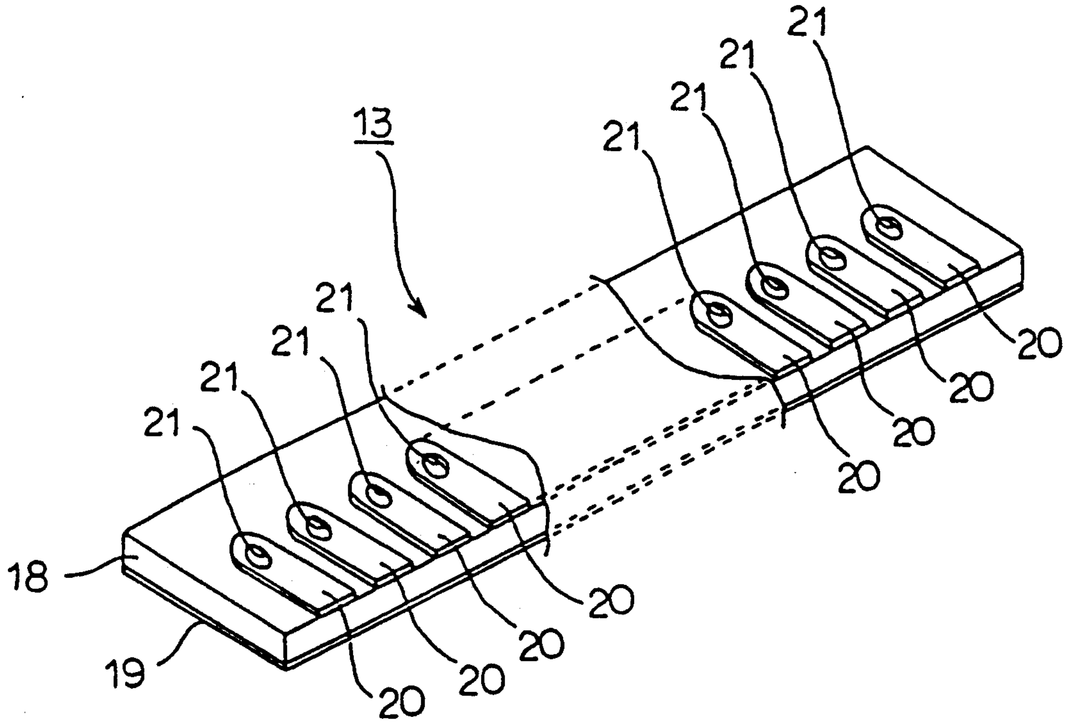
FIG. 2 is a perspective view of the toner particle control member shown in FIG. 1.

First, the construction of an image recording apparatus of this embodiment will be explained with reference to FIGS. 1 through 2. FIG. 1 is a schematic illustration showing the image recording apparatus of the present invention, and FIG. 2 is a perspective view showing the toner particle control member with independent electrodes facing up.

A sheet inlet 3 for inserting an image recording medium 2 on which an image will be recorded and a sheet outlet 4 for discharging the image recording medium 2 having the image recorded thereon are provided on the sides of an image recording apparatus 1. The image recording medium 2 inserted through the sheet inlet 3 is fed into the apparatus 1 being supported by a guide 22, and an image is recorded thereon, and is discharged through the sheet outlet 4 to the outside of the apparatus 1.

The sheet inlet 3 and sheet outlet 4 define a substantially linear feed path for the recording medium 2. The linear feed path allows the passage of a rigid recording medium 2, such as thick metal and cardboard sheets, which cannot easily bend. The linear feed path is substantially tangential to the transferring drum 5.

In the center of the image recording apparatus 1, a transferring drum 5, which is an intermediate recording medium, is arranged and various mechanisms to be explained hereafter are also arranged in the apparatus. An image recording station 6 for adhering toner particles T selectively on the transferring drum 5 and for forming the toner particle image thereon is arranged under the transferring drum 5 and diametrically opposite to the recording station b. A transferring station 7 for transferring the toner particle image formed on the transferring drum 5 to the image recording medium 2 is arranged above the transferring drum 5 and diametrically opposite to the recording station 6. Moreover, a thermal fixing station 11 for thermally fixing the toner particle image transferred on the image recording medium 2 is arranged on the left side of the transferring station 7, that is, on the downstream side of the transferring station 7 in the feeding direction of the image recording medium 2. A cleaning station 8 for removing the toner particles T which remain on the transferring drum 5 without being transferred to the image recording medium 2 from the transferring drum 5 in the transferring station 7 is arranged on the lower side of thermal fixing portion 11 and on the left side of the transferring drum 5 and diametrically opposite to the recording station 6. A discharging station 9 for discharging any charge which remains on the surface of the transferring drum 5 is arranged below the cleaning station 8.

The transferring drum 5 is a hollow cylinder made of aluminum which is similar to the transferring drum used for a so-called electrophotographic apparatus. And, an insulative layer which consists of nylon or polyethylene is provided in the inner peripheral surface of the transferring drum 5. A back electrode 10 made of aluminum is fixed within the transferring drum 5, confronting the image recording station 6. The back electrode 10 is connected to a negative DC power supply E1 which applies a voltage of about one kilovolt. The transferring drum 5 is rotatably arranged in the direction indicated by the arrow A in FIG. 1 around a rotation shaft 5A connected to a driving source (not shown).

The image recording station 6 consists of a toner particle supply station and a toner particle control station.

The toner particle supply station comprises a toner particle case 17 which stores the toner particles T therein, a supply roller 15 which is provided in the case 17, a brush roller 12, a supply roller blade 16 and a deflecting member 14. The supply roller blade 16 is arranged so that the one edge thereof may closely come in contact with the surface of the supply roller 15. Each of the supply roller 15 and the deflecting member 14 are arranged in surrounding relationship to the brush roller 12 along with the direction of the rotation of the brush roller 12, that is, according to the direction indicated by the arrow C in FIG. 1. Each of the supply roller 15 and the deflecting member 14 are arranged to come in contact with a brush 12A of the brush roller 12.

The supply roller 15 is rotated in the direction indicated by the arrow B in FIG. 1 by a driving source (not shown) and is made of a sponge material, such as a urethane foam. The supply roller 15 rotates in the direction indicated by the arrow B in FIG. 1, so that the toner particles T stored in the toner particle case 17 are triboelectrically charged. In this embodiment, the toner particles T are charged with a positive polarity. The charged toner particles T are supported on the surface of the supply roller 15. The supply roller 15 supplies the charged toner particles T to the brush roller 12 by further rotating in the direction indicated by the arrow B.

The supply roller blade 16 removes excess toner particles from the supply roller 15, makes the layer thickness of the toner particles T uniform, and makes the surface of the layer of toner particles T on roller 15 smooth.

As for the brush roller 12, the center portion thereof is made of aluminum and the brush 12A is made of conductive nylon bristles which include carbon in the nylon. The bristles extend outwardly around to the center portion 12. The brush 12A is arranged to come in contact with the supply roller 15. Therefore, the toner particles T supported on the surface of the supply roller 15 are fed to come in contact with the brush 12A of the brush roller 12. At this time, the toner particles T are further triboelectrically charged by contacting the brush 12A rotated in the direction indicated by the arrow C in FIG. 1. The toner particles T, which are now highly positively charged, move from the surface of the supply roller 15 to the brush 12A, because the center of the brush roller 12 is grounded. Moreover, the brush roller 12 is rotated in the direction indicated by the arrow C by a driving source (not shown), so that the toner particles T supplied from the supply roller 15 are fed below the toner particle control member 13 (to be described later) by the rotation of the brush roller 12.

The deflection member 14 is formed of rigid materials, such as metal or ceramics, and is fixed to a position where it comes in contact with the brush 12A of the brush roller 12. When the brush roller 12 rotates, the brush 12A comes in contact with the deflection member 14 and the bristles bend or deflect elastically. When the brush roller 12 rotates further in the direction indicated by the arrow C, the brush 12A bends further and the bristles then snap away from the deflection member 14 as they move past it. The brush 12A then returns to its original shape by its own elasticity. At this moment, the toner particles T which are supported on the brush 12A separate from the brush 12A. As a result, the toner particles T thus separated from the brush roller 12 form a mist and are supplied below the toner particle control member 13.

The toner particle control station consists of the toner particle control member 13 and a plurality of signal circuits S connected to independent electrodes 20.

The construction of the toner particle control member 13 now will be explained with reference to FIG. 2.

The toner particle control member 13 comprises a plurality of apertures 21, an insulative layer 18, a reference electrode 19, and a plurality of independent electrodes 20. The insulative layer 18 is a thin board which comprises an insulating material. Any material can be used as an insulating material if the material has an insulating characteristic. It is thus possible to use films such as a resin, ceramic, and PET (polyethylene terephthalate) film. The reference electrode 19 is provided on the insulative layer 18, which confronts the brush roller 12. Electrode 19 can be a grounded metallic layer. The plurality of apertures 21 penetrate the insulative layer 18 and the reference electrode 19. Moreover, the plurality of apertures 21 are arranged in one line. In addition, the independent electrode 20 is a metallic layer installed independently around each aperture 21 and on a side of insulative layer 18 opposite the side where the reference electrode 19 is installed.

The number of the signal circuits S corresponds to the number of independent electrodes 20. One of the signal circuits is independently connected to each independent electrode 20. The signal circuits S generate pulses according to an image signal independently to each independent electrode 20. As mentioned above, since the negative DC power supply E1 is connected to the back electrode 10 (FIG. 1), the toner particles T which have selectively passed through each aperture 21 of the toner particle control member 13 and which are charged with a positive polarity, are attracted to the surface of the transferring drum 5, so that a toner particle image is formed on the transferring drum 5.

The transferring portion 7 comprises a transfer corona 7A and a negative DC power supply E2 to which the transfer corona 7A is connected. The construction of the transfer corona 7A is well known in general, so that the detailed explanation will be omitted.

The transferring portion 7 is located opposite to, and preferably diametrically opposite to the toner particle control section 6 so that toner particles cannot be attracted directed onto the recording medium 2 from the control section 6, thereby deteriorating the quality of the image formed on recording medium 2.

The rigid image recording medium 2 is supported by the guide 22 and passes between the transferring drum 5 and the transfer corona 7A. At this time, the corona discharge is generated by the transfer corona 7A, and the corona current is irradiated to the image recording medium 2, which has been transported. As a result, the toner particle image formed on the transferring drum 5 is transferred from the transferring drum 5 to the image recording medium 2. The space between the transferring drum 5 and the transfer corona 7A is about 3 millimeters, so that a relatively thick image recording medium can pass through the space. The image recording medium 2 is fed to the thermal fixing portion 11 after passing through the space between transferring drum 5 and transfer corona 7A.

The thermal fixing portion 11 comprises a heated roller 23 with a heat source 23A and a press roller 24. The heated roller 23 and the press roller 24 are arranged such that the image recording medium 2 on which the toner particles T adhere can pass between both rollers. Both rollers 23 and 24 are rotatably supported by a driving source (not shown). The heated roller 23 is preferably made of aluminum which is coated with polytetrafluoroethylene and the press roller 24 is made of silicon rubber. When the image recording medium 2 passes between the heated roller 23 and the press roller 24, the image recording medium 2 is pressurized and heated, and the toner particle image is fixed on the image recording medium 2.

The cleaning station 8 comprises a case 8A, a cleaning roller 8B, and a cleaning blade 8C. The case 8A is arranged detachably in the apparatus and the cleaning roller 8B and the cleaning blade 8C are arranged in the case 8A.

The cleaning roller 8B is made of sponge material, such as a urethane foam. Moreover, the cleaning roller 8B comes in contact with the transferring drum 5 and is supported rotatably for removing the toner particles T which remain on the transferring drum 5 after the toner particle image is transferred on the image recording medium 2 in the transferring portion 7.

The cleaning blade 8C is formed of rigid materials, such as metals or ceramics, and is fixed to the position where one edge comes in contact with the surface of cleaning roller 8B. The cleaning blade 8C removes toner particles T from the cleaning roller 8B which have been removed from the transferring drum 5 by the cleaning roller 8B. The removed toner particles T are stored in the case 8A.

The discharging station 9 consists of a discharging roller 9A made of aluminum. The discharging roller 9A is grounded, and comes in contact with the transferring drum 5 and is supported rotatably for removing the charge which remains on the surf ace of the transferring drum 5.

The discharging portion 9 is provided in order to remove any charge on the drum 5 from the preceding imaging process or from the cleaning station 8 so that there is no influence on the succeeding imaging process.

Next, the operation of the image recording apparatus 1 of the present embodiment will be explained.

When a start switch (not shown) is pressed by an operator, the operation for supplying the toner particles T which form a mist below the toner particle control member 13 in the image recording portion 6, rotation of the transferring drum 5, and rotation of both rollers 23 and 24 of the thermal fixing portion 11 are started.

First, in the image recording portion 6, the supply roller 15 and the brush roller 12 start to rotate in each direction indicated by the arrows B and C by a driving source (not shown). Then, the toner particles T stored in the toner particle case 17A are tribo-electrically charged by contacting with the supply roller 15. The toner particles T are charged with, for example, a positive polarity. The positively charged toner particles T are electrostatically supported on the surf ace of the supply roller 15, so that the toner particles T are fed in the direction indicated by the arrow B of the supply roller 15. The supply roller blade 16 is arranged so that the one edge thereof may closely come in contact with the surface of the supply roller 15. Therefore, the supply roller blade 16 removes excess toner particles from the supply roller 15. As a result, a layer of the toner particles T having an uniform thickness and a smooth surface is formed on the surface of the supply roller 15. The positively charged toner particles T are supported on the surface of the supply roller 15 and are fed into contact with the brush 12A of the brush roller 12. At this time, the toner particles T are further tribo-electrically charged by contacting the brush 12A of the brush roller 12 rotated in the direction indicated by the arrow C in FIG. 1. Thus, the toner particles T are highly charged with a positive polarity. The positively charged toner particles T are moved from the surface of the supply roller 15 to the brush 12A of the brush roller 12. A uniform amount of the toner particles T is supplied to the brush roller 12 by this arrangement. Next, below the toner particle control member 13, the deflection member 14 deflects the bristles of brush 12A of the brush roller 12, which support the toner particles T thereon. That is, since the deflection member 14 is fixed in the position where it comes in contact with the brush 12A of the brush roller 12, when the brush roller 12 rotates, the brush 12A comes in contact with the deflection member 14 and bends by its own elasticity. When the brush roller 12 rotates further in the direction indicated by the arrow C, the brush 12A bends further and then snaps away from the deflection member 14. The brush 12A then returns to its original shape by its own elasticity. At this moment, the toner particles T which are supported on the brush 12A separate from the brush 12A. As a result, the toner particles T thus separated from the brush roller 12 form a mist and are supplied below the toner particle control member 13. The position where the toner particles T are supplied is near the aperture 21 of the side of the reference electrode 19 of the toner particle control member 13.

The mist of the toner particles T supplied near the aperture 21 is controlled by the toner particle control member 13. That is, when a negative voltage is applied from the signal circuit S to the independent electrode 20, the electric field, which extends from the reference electrode 19 to the independent electrode 20, is generated in the aperture 21. And, the positively charged toner particles T are driven by this electric field and pass through the aperture 21. When a voltage is not applied from the signal circuit S, the electric field is not generated in the aperture 21. Therefore, the toner particles T do not pass the aperture 21. The image information is supplied from image information supplying means (not shown) to each signal circuit S as a pulse voltage. Each aperture 21 corresponds to a dot of the formed image, so that an image is formed by control of the toner particles T passing through or not passing through each aperture 21.

The toner particles T which have passed the toner particle control member 13 travel toward the back electrode 10, which is fixed within the transferring drum 5 and which is connected to the negative power supply E1. Therefore, the toner particles T are attracted to the transferring drum 5 in front of the back electrode 10 and the toner particle image is formed on the transferring drum 5. Then the toner particle image is f ed to the transfer corona 7A by the rotation of the transferring drum 5 in the direction indicated by the arrow A in FIG. 1.

On the other hand, the image recording medium 2 inserted from the sheet inlet 3 is f ed to the transfer corona 7A supported by the guide 22. At this time, the toner particle image formed on the transferring drum 5 is transferred on the image recording medium 2. Since such transfer technology of the toner particle image is widely used in electrophotographic copiers, an explanation will be omitted.

The image recording medium 2 on which the toner particle image is transferred is fed to the thermal fixing device 11. And, the toner particle image on the image recording medium 2 is thermally fixed. Since this thermal fixing method is already well known, a detailed explanation will be omitted.

The image recording medium 2 which passes the thermal fixing device 11 is fed to the sheet outlet 4 and is discharged.

As explained above, according to this embodiment, the position where the image is formed on the transferring drum 5, that is, a position where the back electrode 10 is provided, can be separated from a position where the toner particle image is transferred to the image recording medium 2, that is, a position where the transfer corona 7A is provided, by using the transferring drum 5 as an intermediate recording medium. It is not necessary to have the image recording medium 2 pass through the space between the toner particle control member 13 and the back electrode 10. Therefore, the thickness of the image recording medium 2 is not limited, so that it is possible to form the image to a wide variety of image recording mediums, such as the corrugated paper, metal, cloth, and resin.

By positioning the transfer station 7 diametrically opposite to the particle control member 13, all the toner particles which pass through the control member are attracted to the transferring drum 5. There is no possibility for the particles to be attracted directly onto the recording medium 2, which could result in the scattering of toner particles and a lessening of image quality.

It is to be understood that the present invention is not restricted to the particular forms shown in the foregoing embodiment, and various modifications and alterations can be added thereto without departing from the scope of the invention encompassed by the appended claims.

Figure 3:
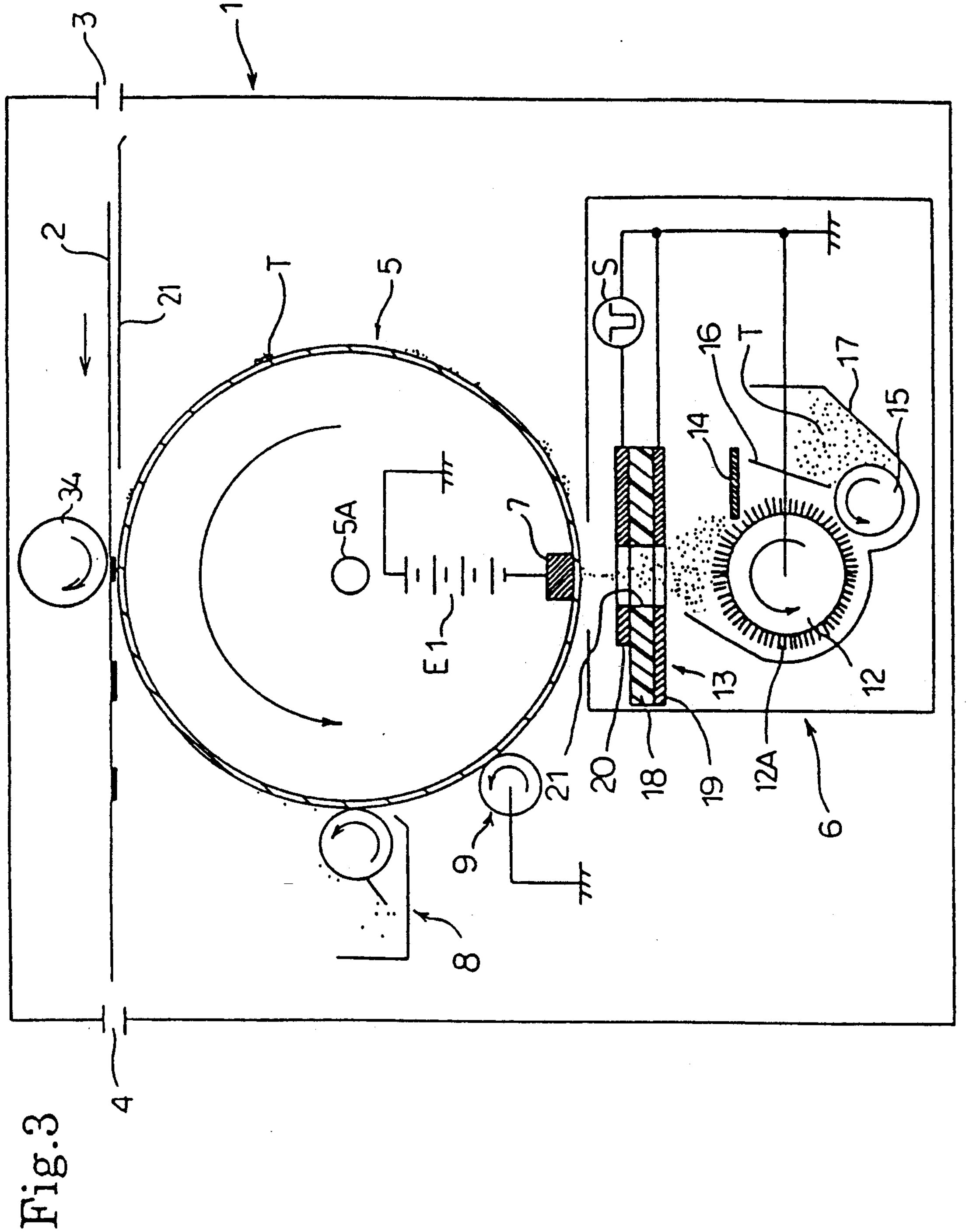
FIG. 3 is a schematic view showing another image recording apparatus of the present invention.

For example, as shown in FIG. 3, it is possible to use a heat transfer method, which transfers the toner particle image onto the image recording medium 2 in place of the transfer corona 7A. In this embodiment the heated roller 34 is pressed against the transferring drum 5 through the image recording medium 2, for transferring the toner particle image from the transferring drum 5 to the image recording medium 2. According to this construction, the transfer of the toner particle image to the image recording medium 2 and the thermal fixing of the image are performed at the same time, so that the transfer corona 7A and the thermal fixing portion 11 become unnecessary, and the entire image recording apparatus becomes compact.

Figure 4:
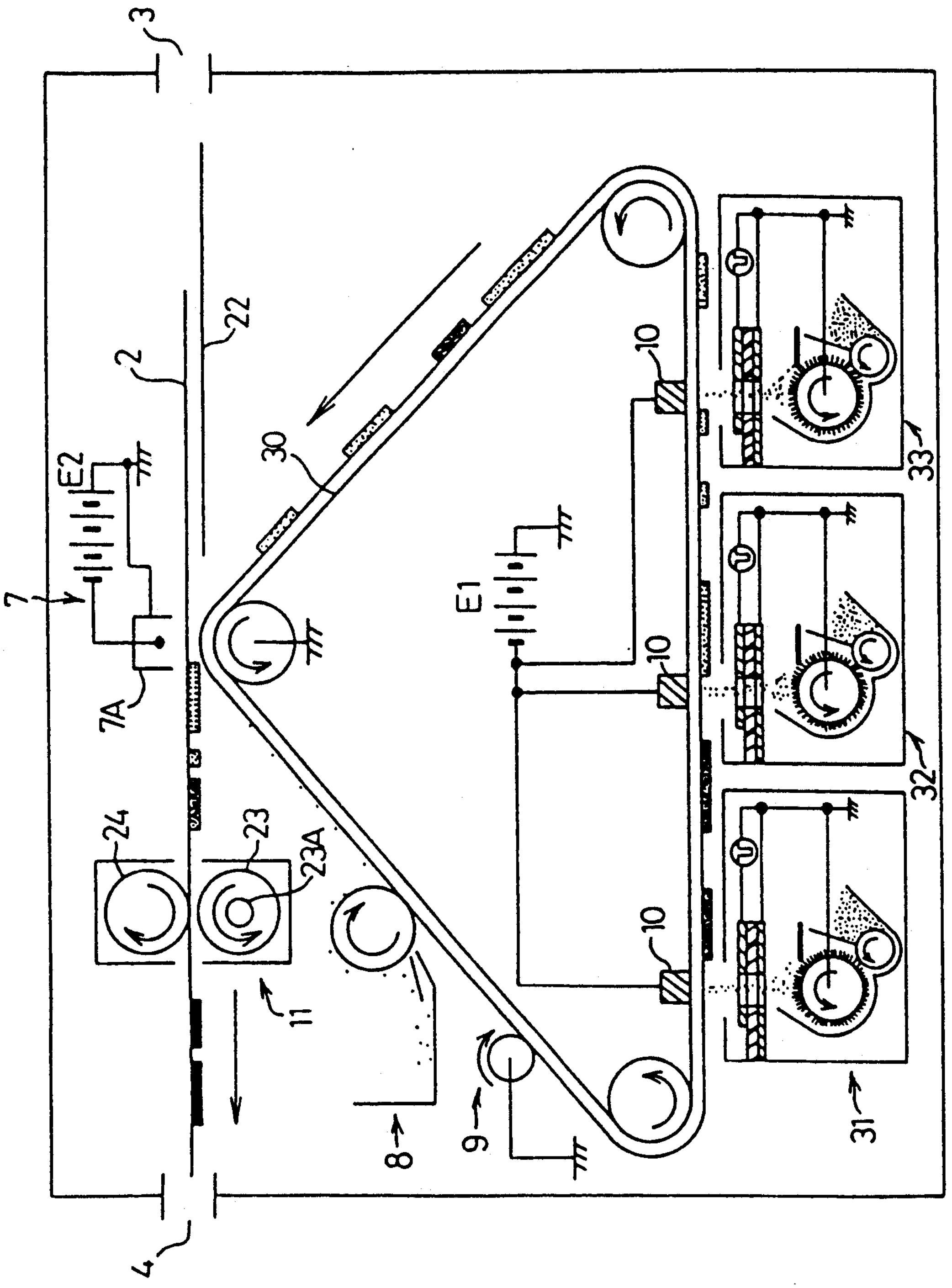
FIG. 4 is a schematic view showing another image recording apparatus of the present invention.

Moreover, as shown in FIG. 4, it is possible to use a transfer belt 30, instead of the transferring drum 5, as an intermediate recording medium.

Moreover, as shown in FIG. 4, it is possible to arrange a plurality of image recording stations 31, 32, and 33, to store the different color toner particles therein, and to record multicolor or full color images on the image recording medium 2. In this case, it is possible to provide the same number of transfer belts 30 as image recording stations. Moreover, the heated roller 34 as shown in FIG. 3 can be used when the intermediate recording medium is the transfer belt 30.

In FIGS. 3 and 4, the numbered elements corresponds to like-numbered elements of FIG. 1.

What is claimed is:

1. An image recording apparatus for recording an image on a rigid recording medium, comprising:

toner particle supply means for supplying toner particles charged to a first polarity;

control means for controlling toner particles supplied by said toner particle supply means according to an image to be recorded, said control means having at least one aperture allowing said charged toner particles to pass therethrough;

an intermediate recording member for attracting the toner particles controlled by said control means through said at least one aperture and for forming a toner image thereon;

transfer means for transferring the toner image formed on said intermediate recording member to the rigid recording medium, said transfer means being located on a side of the intermediate recording member opposite to the control means;

a sheet inlet and a sheet outlet arranged to define a linear feed path for the rigid recording medium, said feed path passing between the intermediate recording member and the transfer means; and fixing means for fixing the toner image, which is transferred to the rigid recording medium by said transfer means, on the rigid recording medium.

2. The image recording apparatus according to claim 1, wherein said control means comprises a control electrode for directly controlling toner particles supplied by said toner particles to said intermediate recording medium, said control electrode including:

an insulative layer having opposed sides;

a reference electrode provided on one of the opposed sides of said insulative layer, said reference electrode confronting said toner particle supply means;

said plurality of apertures penetrating said insulative layer and said reference electrode; and a plurality of independent electrodes being installed independently around each aperture, said independent electrodes being installed on a side of said insulative layer opposite the side where the reference electrode is installed.

3. The image recording apparatus according to claim 2, wherein said toner particle supplying means comprises:

a toner particle case for storing the toner particles therein;

a supply roller for triboelectrically charging the toner particles to a first polarity, said supply roller being provided in said toner particle case and being capable of rotating; and a brush roller for supporting the charged toner particles supplied from said supply roller thereon and for feeding the charged toner particles to form a mist of the charged toner particles adjacent the control means, said brush roller being mounted for rotation in said toner particle case.

4. The image recording apparatus according to claim 1, wherein said intermediate recording member comprises:

a transferring drum for supporting toner particles selectively supplied by said control electrode, said transferring drum comprising a rotatable hollow cylinder; and a back electrode mounted within the transferring drum, said back electrode confronting said control electrode through a surface of said transferring drum, said back electrode being connected to a power supply supplying a second polarity opposite to the first polarity.

5. The image recording apparatus as in claim 4, wherein the transfer means is located diametrically opposite to the control means.

6. The image recording apparatus according to claim 2, said image recording apparatus further comprising a plurality of signal circuit, each signal circuit being independently connected to a single one of said independent electrodes for supplying an image signal for each of said independent electrodes.

7. The image recording apparatus according to claim 1, wherein said transfer means comprises a transfer corona.

8. The image recording apparatus according to claim 1, wherein said fixing means comprises:

a heated roller having a heat source; and a press roller.

9. The image recording apparatus according to claim 1, further comprising cleaning means for removing toner particles which remain on said intermediate recording medium after the toner particle image is transferred to said rigid recording medium by said transfer means.

10. The image recording apparatus according to claim 9, further comprising discharging means for removing a charge which remains on said transfer means after toner particles are removed by said cleaning means.

11. The image recording apparatus according to claim 1, wherein said intermediate recording member comprises:

a moveable transfer belt for supporting toner particles selectively supplied by said control electrode, said transfer belt being provided above said control electrode; and a back electrode provided on an inner side of said transfer belt, said back electrode confronting with said control electrode through a surface of said transfer belt, said back electrode being connected to a power supply suppling a second polarity opposite to the first polarity.

12. The image recording apparatus according to claim 11, further comprising a plurality of toner particle supply means provided below said transfer belt.

13. The image recording apparatus according to claim 12, wherein each of said plurality of toner particle supply means supplies different color toner particles from each of the other of said plurality of toner particle supply means.

14. The image recording apparatus according to claim 1, wherein said transfer means and said fixing means comprise a heated roller.

15. The image recording apparatus as in claim 1, wherein the control means is located below the intermediate recording member and the transfer means is located above the intermediate recording member.

16. The image recording apparatus as in claim 15, wherein the intermediate recording member comprises a cylindrical drum and the control means is positioned diametrically opposite to the transfer means with respect to the drum.

17. The image recording apparatus as in claim 15, wherein the feed path is substantially horizontal.

18. The image recording apparatus as in claim 1, wherein the transfer means is spaced from the intermediate recording member a distance in excess of about 1 mm.

19. The image recording apparatus as in claim 18, wherein said distance is between about 1 mm and about 3 mm.

20. The image recording apparatus as in claim 1, further comprising a plurality of toner particle supply means each of said plurality of toner particle supply means supplying one of a plurality of differently-colored toner particles, the control means controlling toner particles supplied by each of said plurality of toner particles supply means.

21. An image recording apparatus for recording an image on a rigid recording medium, comprising:

toner particle supply means for supplying toner particles charged to a desired polarity;

an intermediate recording member for attracting the toner particles supplied from the toner particle supply means and for forming a toner image thereon;

transfer means for transferring the toner image formed on said intermediate recording member to the rigid recording medium, said transfer means being located on a side of the intermediate recording member opposite to the toner particle supply means;

a sheet inlet and a sheet outlet arranged to define a linear feed path for the rigid recording medium, said feed path passing between the intermediate recording medium and the transfer means;

fixing means for fixing the toner image on the rigid recording medium, the toner image being transferred to the rigid recording medium by said transfer means; and control means for controlling toner particles supplied by said toner particle supply means according to an image to be recorded, the control means being located between the tone particle supply means and the intermediate recording member so that the toner particles pass the control means before contacting the intermediate recording member.

* * * * *

UNITED STATES PATENT AND TRADEMARK OFFICE
CERTIFICATE OF CORRECTION

PATENT NO. 5,305,026

DATED April 19, 1994

INVENTOR(S) : Kazuo Sangyoji et al.

It is certified that error appears in the above-indentified patent and that said Letters Patent is hereby corrected as shown below:

On the title page: Item[19] and [75] change "Sangyoji Kazuo" to --Kazuo Sangyoji --.

Signed and Sealed this

Twenty-sixth Day of July, 1994

Attest:

BRUCE LEHMAN

*Attesting Officer* *Commissioner of Patents and Trademarks*